United States Patent [19]
Gow

[11] 3,906,848
[45] Sept. 23, 1975

[54] TOAST-HOLDING STAND
[76] Inventor: Edward John Gow, Apt. No. 101, 190 Exbury Rd., Downsview 464, Ontario, Canada
[22] Filed: June 18, 1973
[21] Appl. No.: 371,180

[52] U.S. Cl. .................. 99/339; 108/115; 248/432
[51] Int. Cl.² ........................................ A47J 36/24
[58] Field of Search .......... 248/431, 432, 164, 165, 248/166, 464; 108/115; 126/30, 27, 9 R, 59; 99/339, 340, 385, 391

[56] References Cited
UNITED STATES PATENTS

| | | | |
|---|---|---|---|
| 2,693,751 | 11/1954 | Allen | 99/339 |
| 2,749,836 | 6/1956 | Wedge | 99/339 |
| 2,873,156 | 2/1959 | Botnick | 108/115 |
| 2,919,092 | 12/1959 | Chasar et al. | 248/432 |
| 3,247,811 | 4/1966 | Bauder | 108/115 |
| 3,685,824 | 8/1972 | Quinn | 248/164 |

FOREIGN PATENTS OR APPLICATIONS
618,022    4/1961    Canada .............................. 118/115

Primary Examiner—Marion Parsons, Jr.

[57] ABSTRACT

A stand for supporting slices of toast for the purpose of keeping them warm and for use with a conventional top-loading electric toaster comprises a pair of pivotally interconnected legs which, in use, are disposed in a vertical plane and which are movable between open and closed positions. Arms extend forwardly from the upper ends of the legs and feet extend forwardly from the lower ends of the legs for positioning beneath the toaster. An imperforate copper plate is removably supported on the arms so as to be disposed above the toaster, that plate also serving to hold the legs in their open position. Heat rising from the toaster is absorbed by the copper plate on which the toasted slices are placed until they are to be eaten.

14 Claims, 3 Drawing Figures

US Patent   Sept. 23, 1975   3,906,848
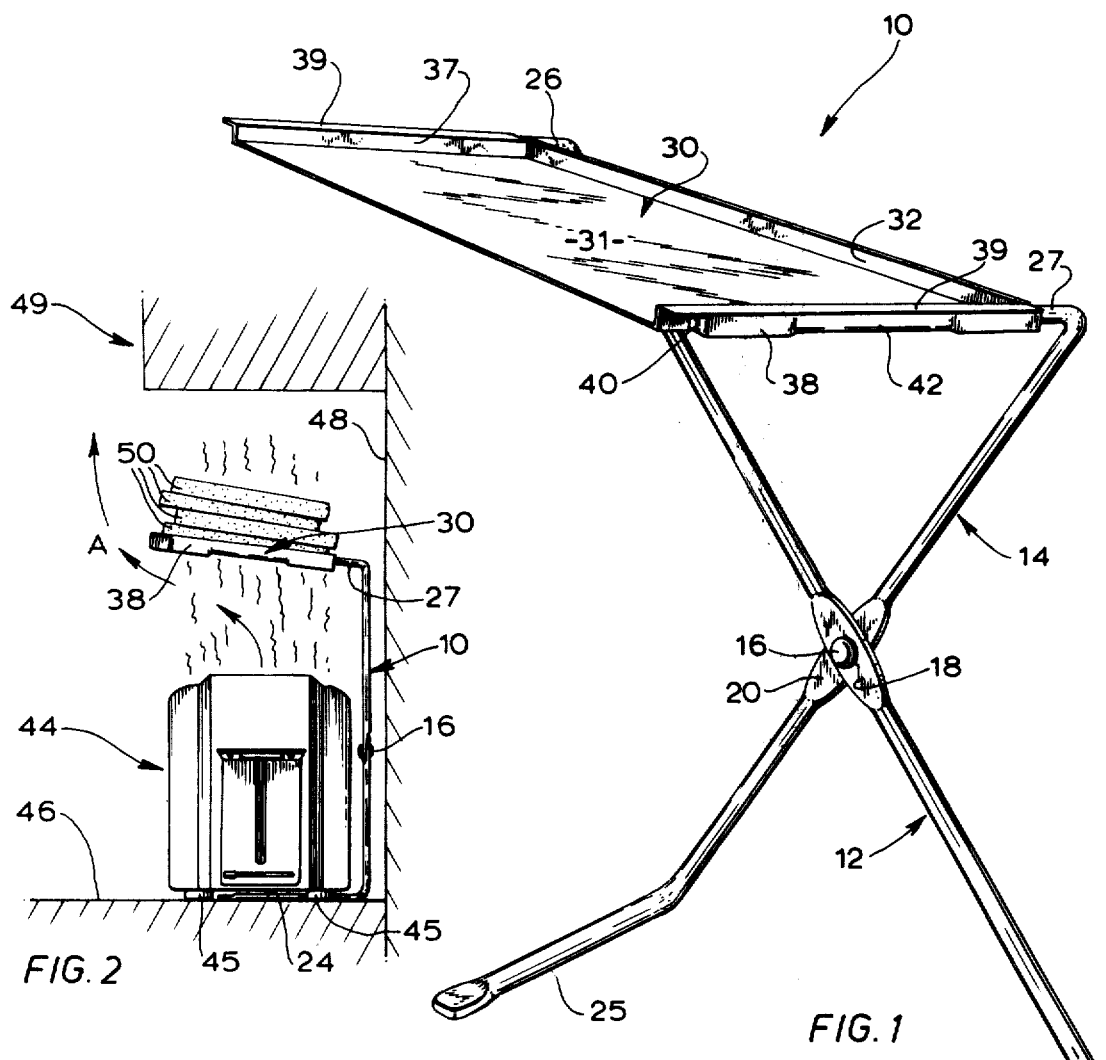
FIG. 2
FIG. 1
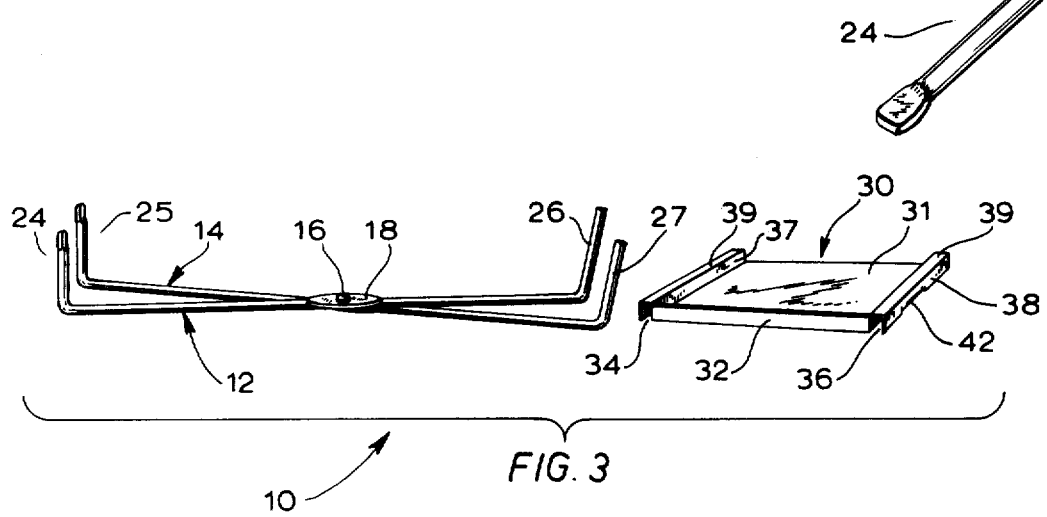
FIG. 3

TOAST-HOLDING STAND

BACKGROUND OF THE INVENTION

The present invention relates to a toast-supporting stand intended for use with a conventional top-loading electric toaster for the purpose of keeping slices of toast warm until they are to be eaten.

Various devices for the same purpose have previously been proposed but such previously proposed devices have presented certain practical disadvantages. For example, some of the known devices have been relatively complex in their construction and have, therefore, proved to be somewhat expensive to manufacture. Others of the known devices have restricted access to the loading apertures in the toasters and some have even been constructed in such a way that it has been necessary to remove such a device from the toaster before further slices of bread could be placed in such a toaster.

Yet another serious disadvantage of many of the devices previously proposed is that they have been constructed in such a way that excessive drying of the slices of toast took place while those slices were supported on such a device.

It is accordingly an object of the present invention to provide a heat-retaining support stand for the aforementioned purpose and which stand presents several advantages compared to the stands previously proposed.

A particular object of this invention is to provide a heat-retaining support stand for use with a top-loading electric toaster and which stand has a relatively simple and inexpensive construction.

Another important object of this invention is to provide a heat-retaining stand which, when not in use, can be converted into one or more components, each having an essentially planar configuration, so facilitating packaging and storage of the stand.

Other objects of the invention will become apparent as the description herein proceeds.

SUMMARY OF THE INVENTION

Broadly, the present invention provides a heat-retaining support stand for use with an electric toaster and which device comprises a generally planar supporting structure for disposition in a vertical plane; a base adapted to extend forwardly and generally horizontally from said supporting structure when that supporting structure is disposed in a vertical plane; and a thermally conductive and heat-retaining plate adapted to be supported in a cantilever manner from said supporting structure to extend forwardly therefrom upwardly of said base when said supporting structure is disposed in a vertical plane for disposition of items of food thereon, said support stand being adapted to be converted into one or more components, each having an essentially planar configuration.

In a particular embodiment of a heat-retaining support stand in accordance with this invention and as to be described in greater detail hereinafter with reference to the accompanying drawings, the aforementioned supporting structure usefully comprises a pair of elongated legs pivotally interconnected between their ends to provide, on angular rotational separation thereof, a collapsible and generally planar supporting frame, said legs being movable between a closed position and an open position in which they are more angularly separated than when in said closed position. In such a stand in accordance with this invention, the base usefully comprises first and second feet extending forwardly and generally horizontally from lower ends of respective ones of said legs when said supporting frame is disposed in its open position and in a vertical plane.

The thermally conductive and heat-retaining plate provided in a stand in accordance with this invention is advantageously formed of copper or of a similarly highly conductive metal. Particularly advantageous results have been obtained in a stand in accordance with this invention by using an imperforate plate of sheet copper having a thickness of about 0.047 inch.

Other features and advantages of the invention will become apparent as the description herein proceeds.

BRIEF DESCRIPTION OF THE DRAWINGS

The invention will now be described merely by way of illustration with reference to the accompanying drawings in which:

FIG. 1 is a perspective view of one embodiment of a support stand in accordance with this invention and showing that stand assembled for use;

FIG. 2 is a side elevation showing the manner in which the stand shown in FIG. 1 is used in association with a conventional top-loading electric toaster; and FIG. 3 is a perspective view of the stand of FIGS. 1 and 2, and showing that stand disassembled and the legs of the stand moved into a closed storage position thereof.

DESCRIPTION OF THE PREFERRED EMBODIMENT

The stand generally indicated at 10 in the accompanying drawings comprises first and second legs generally indicated at 12 and 14 respectively, and which legs are pivotally interconnected between their upper and lower ends by a rivet 16 extending through openings formed in flattened portions 18 and 20 of those legs 12 and 14 respectively for rotational movement of the legs 12 and 14 between the open and closed positions shown in FIGS. 1 and 3 respectively. In the open position shown in FIG. 1, the legs 12 and 14 provide a generally planar supporting structure or frame.

At their lower ends, the legs 12 and 14 are integrally formed with first and second feet 24 and 25 respectively which are essentially parallel to each other and which extend forwardly and generally horizontally from the supporting frame constituted by the legs 12 and 14 when that frame is disposed in a vertical plane as shown in FIGS. 1 and 2.

At their upper ends, the legs 12 and 14 are similarly integrally formed with mutually parallel and forwardly extending arms 26 and 27 respectively. As is best shown in FIG. 2, the arms 26 and 27 extend slightly upwardly for a reason yet to be explained when the frame constituted by the legs 12 and 14 is disposed in a vertical plane.

The stand 10 also comprises a thermally conductive and heat-retaining plate generally indicated at 30 and including an essentially imperforate and generally planar central portion 31. Along its rear edge, the plate 30 is deformed to provide an upstanding lip 32 while, along its side edges, it is deformed to provide downwardly open recesses 34 and 36 defined by inner and outer lips 37 and 38 respectively and transverse webs 39.

To assemble the stand 10 from its unassembled configuration as shown in FIG. 3 and in which the plate 30 is separate from the legs 12 and 14 and in which those legs are pivoted into a generally planar configuration, those legs are pivotally opened and the arms 26 and 27 at their upper ends are inserted into respective ones of the recesses 36 and 34. Usefully, the outer lips 38 defining the recesses 34 and 36 are turned inwardly as indicated at 40 to prevent rearward movement of the plate 30 beyond the position shown in FIG. 1. Additionally, the outer lips 38 are usefully inwardly deformed as shown at 42 to provide some degree of frictional engagement of the plate 30 with the arms 26 and 27.

It will now be understood that the plate 30, when so fitted on the arms 26 and 27, serves to prevent pivotal opening movement of the legs 12 and 14 beyond the open position shown in FIG. 1.

In the particular embodiment of the stand 10 as shown in the accompanying drawings, the plate 30 is usefully formed of sheet copper of about 0.047 inch thickness.

Referring now to FIG. 2, there is shown therein the manner in which the stand 10 is used in conjunction with a toploading electric toaster generally indicated at 44 and of conventional construction, and which will not be described in greater detail herein other than to point out that it is provided with four legs 45, two of which can be seen in FIG. 2.

In FIG. 2, the toaster 44 is shown as being disposed on a kitchen counter 46 which extends outwardly from a wall 48. A cupboard or similar unit 49 is shown as being wall mounted above the counter 46.

For use, the feet 24 and 25 of the stand 10 are inserted forwardly beneath the toaster 44 so as to be disposed between the legs 45 of that toaster 44 and so that the plate 30 is positioned above the toaster.

When slices of bread, or other food items, are inserted into the toaster 44 in a conventional manner, heat rising from the toaster 44 is absorbed by the plate 30 which can then be used to support slices of toast 50, or other food items, for the purpose of keeping them warm until they are to be eaten as will readily be understood by reference to FIG. 2.

As a result of the slight forward upward slope of the plate 30, hot air rising from the toaster 44 is deflected forwardly as indicated by the arrows A so resulting in less risk of staining or scorching of the undersurface of the cupboard 49 than would be the case if the stand 10 were not used.

Although the invention is not restricted to the use of any specific material for the plate 30, the use of a plate formed, as already mentioned, of sheet copper and having a thickness of about 0.047 inch has proved to be particularly effective when used on a stand 10 having an operating height of about 12 inches. The length of time for which a stand 10 is effective to maintain toast supported thereon at a satisfactory temperature is dependent on many factors of which there can be mentioned the room temperature, the extent of any air circulation about the stand and the total duration of operation of the toaster 44. Clearly, if the toaster 44 is used for toasting several slices of bread, more heat will be available for absorption by the plate 30 and that plate will then be effective for keeping toast warm for a longer period of time than if the toaster went through only one operating cycle.

With the particular stand 10 already described, toast storage on the plate 30 for periods of 4 to 5 minutes and even longer has proved quite possible.

Another advantage of the stand 10 and which results from the use of the imperforate plate 30 is that it does not result in significant drying out of the slices of toast 50 supported thereon.

Yet another important advantage of the stand 10 is that it is very easily cleaned.

Although the invention has been described with particular reference to the embodiment 10 thereof as shown in the accompanying drawings, it will be understood that numerous modifications are possible. For example, the invention is not restricted to the particular support structure illustrated. It is, however, an important feature of this invention that a stand in accordance therewith can be readily converted from an assembled configuration such as shown in FIG. 2 for the stand 10 into a storage configuration such as shown in FIG. 3, for the stand 10, and in which it comprises one or more components, each of which has a generally planar configuration so to permit the stand to be packaged and/or stored in a relatively small package or space.

In another embodiment of a stand in accordance with this invention, the engagement of the feet of such a stand with the legs 45 of a toaster 44 can be used to limit pivotal opening movement of the legs of such a stand beyond their open position. The plate of the stand can then simply be supported on the arms provided at the upper ends of the legs in distinction to the hereinbefore described additional function of the plate 30 for limiting opening movement of the legs 12 and 14 beyond the open position.

What is claimed is:
1. In combination:
   an electric toaster;
   a collapsible supporting structure comprising:
   a. a pair of elongated legs disposed generally vertically behind said toaster and pivotally interconnected between their ends so as to be movable between a closed position and an open position in which they are more angularly separated than when in said closed position,
   b. first and second feet extending forwardly and generally horizontally beneath said toaster from lower ends of respective ones of said legs, and
   c. first and second arms extending generally forwardly over said toaster from respective ones of said legs at their upper ends; and
   a thermally conductive and heat-retaining plate removably supported on said first and second arms with said legs disposed in said open position thereof for disposition of items of food on said plate so that, when said plate is removed from said arms, said supporting structure can be pivoted into an essentially planar configuration.

2. A combination as claimed in claim 1 and in which said feet are essentially parallel to each other.

3. A combination as claimed in claim 2 and in which said feet are integrally formed with respective ones of said legs.

4. A combination as claimed in claim 3 and in which said plate is formed of copper.

5. A combination as claimed in claim 4 and in which said plate has a thickness of about 0.047 inch.

6. A combination as claimed in claim 5 and in which said plate is essentially imperforate.

7. A combination as claimed in claim 1 and in which said plate cooperates with said arms to prevent opening movement of said legs beyond said open position.

8. A combination as claimed in claim 7 and in which said plate is formed with recesses receiving respective ones of said first and second arms.

9. A combination as claimed in claim 8 and in which said first and second arms are essentially parallel to each other.

10. A combination as claimed in claim 8 and in which said first and second arms are integrally formed with respective ones of said legs.

11. A combination as claimed in claim 8 and in which said arms extend angularly forwardly and upwardly from respective ones of said legs.

12. A combination as claimed in claim 8 and in which said plate is formed of copper.

13. A combination as claimed in claim 12 and in which said plate has a thickness of about 0.047 inch.

14. A combination as claimed in claim 13 and in which said plate is essentially imperforate.

* * * * *